United States Patent Office 3,058,824
Patented Oct. 16, 1962

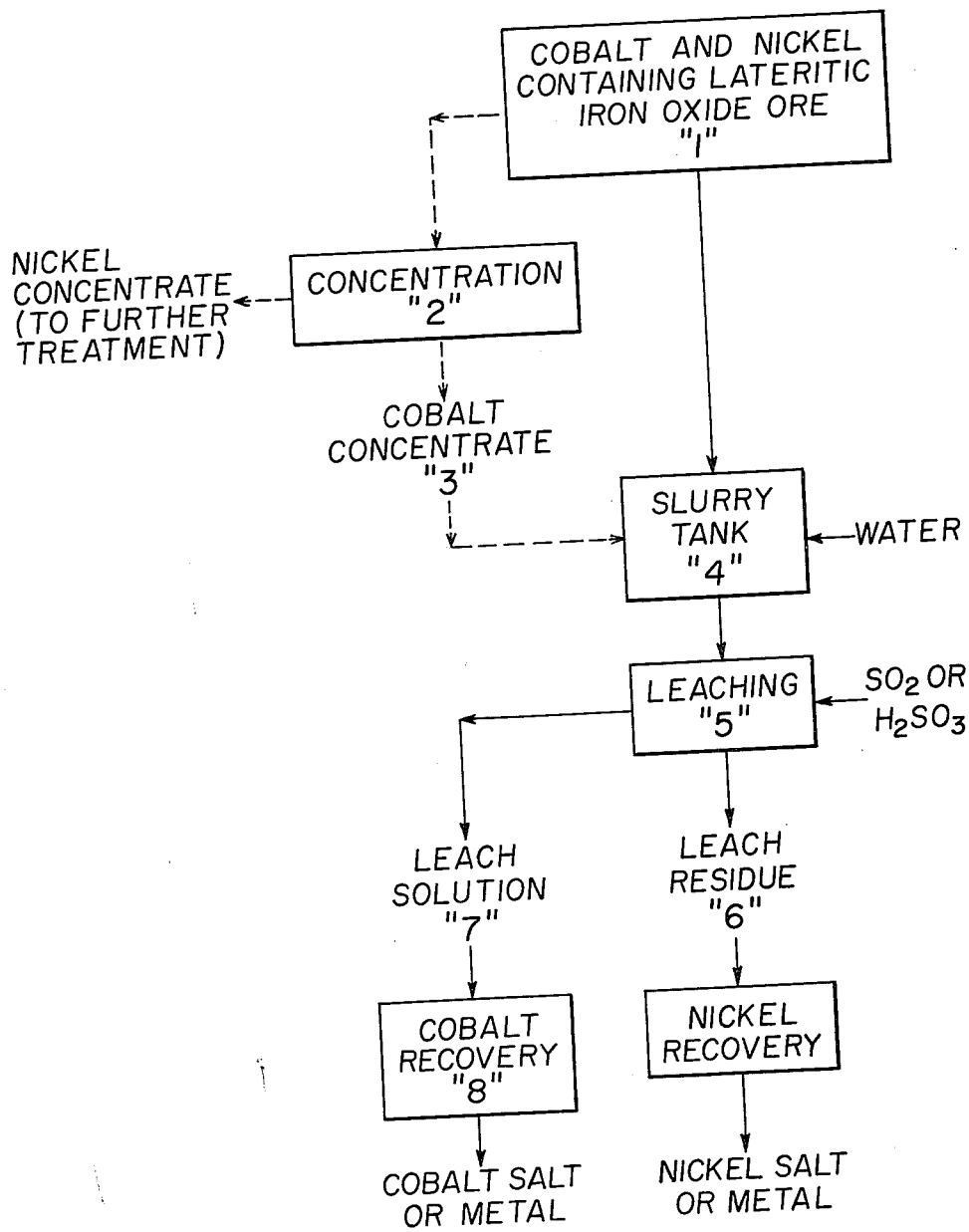

3,058,824
TREATMENT OF LATERITIC COBALT-NICKEL ORES
Alexander Illis, Copper Cliff, Ontario, Canada, assignor to The International Nickel Company, Inc., New York, N.Y., a corporation of Delaware
Filed June 27, 1960, Ser. No. 39,056
Claims priority, application Canada Oct. 16, 1959
7 Claims. (Cl. 75—115)

The present invention relates to a process for the recovery of cobalt and nickel from lateritic ores of the iron oxide type and, more particularly, to a process for separately recovering cobalt and nickel values from lateritic iron oxide ores or concentrates obtained therefrom by a novel sulfur dioxide leaching technique.

Lateritic iron oxide ores such as those of Celebes, New Caledonia, New Guinea, the Philippine Islands, Cuba and the Dominican Republic generally contain significant cobalt values which are difficult to recover by conventional ammonia leaching processes. The recovery of this cobalt would provide a valuable by-product but heretofore conventional industrial-scale operations recovered only 10% to 20% of the available cobalt. Furthermore, the separation of nickel and cobalt from solutions having a relatively high ratio of nickel to cobalt is expensive. The separate extraction and recovery of cobalt and nickel from these ores has been a challenge for many years. The need for increasing cobalt recovery from these low-grade ores has been a pressing one. Although attempts were made to overcome the foregoing difficulties and other difficulties, none, as far as I am aware, was entirely successful when carried into practice commercially on an industrial scale.

It has now been discovered that by using the novel process of the present invention, lateritic iron oxide ores containing both cobalt and nickel can be treated to provide the separate and almost complete extraction of cobalt. Thus, the present invention greatly facilitates the final and separate recovery of substantially all of the cobalt and nickel in pure form from these ores.

It is an object of the present invention to provide an improved method for the separate recovery of cobalt and nickel from lateritic ores of the iron oxide type.

Another object of the invention is to provide a novel process for the separate extraction of cobalt from lateritic iron oxide ores containing cobalt and nickel.

The invention also contemplates providing an improved process for separately leaching substantially all of the cobalt content from a lateritic, cobalt-nickel ore prior to the recovery of the nickel content therefrom.

It is a further object of the invention to provide an improved method for selectively extracting cobalt from lateritic iron oxide ores containing both cobalt and nickel.

The invention further contemplates providing a novel leaching technique which separately extracts and recovers substantially all of the cobalt values from lateritic iron oxide ores containing both cobalt and nickel and leaves substantially all of the nickel in a residue which is amenable to further treatment for recovery of its nickel content.

Other objects and advantages will become apparent from the following description taken in conjunction with the accompanying drawing which illustrates a flow sheet embodying a novel combination of operations in which a lateritic cobalt-nickel ore is treated for recovery of cobalt and nickel.

Generally speaking, the present invention contemplates treating lateritic ores of the iron oxide type, or concentrates obtained therefrom, which ores contain between about 0.5% and about 5% nickel, more than about 0.05% cobalt, between about 25% and about 50% iron and less than about 10% magnesia by a novel sulfur dioxide leaching technique to provide selective extraction of substantially all of the cobalt from the ores or concentrates. The leach residue can then be treated by conventional means for recovery of its nickel content which constitutes substantially all of the nickel originally present in the ore.

In carrying the invention into practice, the raw ore or concentrate obtained therefrom is ground to pass through a 48 mesh Tyler screen and is then slurried with water to give a solids content of about 10% to about 50%. The slurry is agitated and maintained at a temperature of between about 70° F. and about 200 °F., while a solution of sulfurous acid and/or sulfur dioxide gas either in a highly concentrated form or as a dilute gaseous mixture, which may contain nitrogen, carbon dioxide and small amounts of oxygen, is added at the rate of about one to about ten pounds of sulfur per pound of cobalt to dissolve the cobalt in the slurry selectively. The sulfur dioxide addition is distributed over a sufficient period to allow for almost complete reaction and continued until substantially all of the cobalt has been dissolved from the slurried material. The leached slurry is then subjected to solid-liquid separation, washed and the cobalt-containing pregnant solution is treated for cobalt recovery by known methods. The substantially cobalt-free leach residue is then treated, if desired, for nickel recovery, advantageously by the method as disclosed in U.S. Patent No. 2,850,376.

The principles of the invention will be described with reference to the accompanying drawing which illustrates the overall process. An aqueous slurry "4" of cobalt- and nickel-containing lateritic, iron oxide ore "1," or of a cobalt concentrate "3," prepared in concentration step "2" from the lateritic ore is made up to a solids content of between about 10% and about 50% by weight. In leaching step "5" sulfur dioxide gas and/or a solution of sulfurous acid is added to the continuously agitated slurry which is held at a temperature of between about 70° F. and about 200° F. Sulfur dioxide addition, amounting to between one and ten pounds of sulfur per pound of cobalt contained in the slurry, is stopped when substantially all of the cobalt has been dissolved. The leached solids are subjected to solid-liquid separation, e.g., countercurrent decantation, filtration, etc., and washed and the leach residue "6," containing substantially all of the original nickel in the ore, is treated for recovery of its nickel content while the leach solution "7," containing substantially all of the original cobalt in the ore along with some nickel and iron, is treated in the cobalt recovery step "8" by conventional means such as by precipitation as cobaltic hydroxide or as cobalt sulfide.

As stated hereinbefore the ore should be a laterite of the iron oxide type generally considered a final ore product of the laterization or weathering process occurring in a warm and humid climate. Typical ores of this type usually contain less than about 5% nickel and often less than about 2% nickel while the cobalt content varies between about 0.05% and 0.5%, with some fractions as a result of mechanical concentration containing as much as 5% cobalt. These ores usually contain less than about 55% iron, more than about 1% silica and more than about 0.5% magnesia. It is not contemplated that an ore containing more than about 10% magnesia and less than about 0.05% cobalt will be treated as the sulfur dioxide consumption by such ores would be excessive.

The lateric, iron oxide material, consisting of an ore or concentrate, is comminuted, usually, to pass through a 48 mesh Tyler screen and it has been found advantageous to grind the ore or concentrate substantially all through a 100 mesh Tyler screen as the rate of cobalt extraction is increased with increasing fineness of ore particles. The ore or concentrate is then slurried with water to give a solids content of about 10% to about 50% which is maintained throughout the leaching step. However, other solids contents may be used provided that leaching efficiency is not impaired.

During leaching, the temperature of the slurry is maintained at between about 70° F. and 200° F. and advantageously at between about 120° F. and 160° F. Sufficient agitation of the slurry is kept up during leaching to at least prevent settling of solids and sulfur dioxide gas, either highly concentrated or diluted with gases normally encountered in commercial-scale sulfur dioxide production, such as nitrogen, carbon dioxide and oxygen, is added at substantially atmospheric pressure at the rate of about one to about ten pounds of sulfur per pound of cobalt contained in the slurry. The sulfur dioxide may also be added as a solution of sulfurous acid containing between about 0.5% and about 10% sulfur dioxide by weight of solution. The sulfurous acid may be added instead of or in addition to the sulfur dioxide gas. In any case, total sulfur addition amounts to about one to about ten pounds of sulfur per pound of cobalt. A sulfur dioxide treatment time of about forty-five minutes is usually found to be satisfactory to leach out most of the cobalt at a temperature of about 140° F. but, in any case, treatment is continued until between about 90% and about 95% of the cobalt in the ore has been dissolved, at which point sulfur dioxide treatment is stopped since, with further sulfur dioxide addition past this point, iron and nickel values continue to go into solution. Thus, at about 75% cobalt extraction it is found that only traces of nickel and iron are in solution. However, at about 90% cobalt extraction it has been observed that about 4% of the nickel and about 0.8% of the iron in the ore are in solution and at a 95% cobalt extraction about 10% of the nickel and about 1.5% of the iron in the ore are in solution. These figures can, of course, vary with variance in the ore and in treatment conditions but they illustrate the importance of stopping sulfur dioxide addition at between about 90% and about 96% cobalt extraction.

It is found that during the leaching step most of the magnesia in the ore or concentrate is dissolved. Although the presence of magnesia is not particularly harmful in the leach solution, the presence of over 10% magnesia in the ore, such as is found in garnierite ores which may contain up to about 30% magnesia, is deleterious in that large quantities of sulfur dioxide are consumed by the magnesia constituent.

After the leaching step is completed the slurry, containing most of the nickel in the ore, is filtered and washed and the cobalt-containing solution is treated as aforementioned for cobalt recovery by conventional means such as by precipitation as cobaltic hydroxide or cobalt sulfide. The substantially cobalt-free leach residue which contains about 80% or more of the nickel in the ore is treated for nickel recovery by known means such as by selective reduction followed by either ammonia leaching or by carbonyl treatment.

For the purpose of giving those skilled in the art a better understanding of the invention, the following illustrative examples are given:

Example I

Cuban, lateritic, iron oxide ore containing 50.0% iron, 1.10% nickel and 0.14% cobalt was ground to pass through a 100 mesh Tyler screen and was slurried with water to 50% solids. The slurry was heated to 140° F. and agitated while sulfur dioxide gas was bubbled through. In a treatment time of 45 minutes, the metal values extracted were as follows: 95% of the cobalt, 10% of the nickel and 1.5% of the iron. Sulfur dioxide consumption amounted to about 5.7 pounds of sulfur per pound of cobalt in the ore. The leach residue was treated for recovery of the nickel remaining in the ore.

Example II

A lateritic iron oxide ore from New Guinea, ground through a 48 mesh Tyler screen and containing 1.5% nickel, 0.45% cobalt and 45.5% iron was slurried with water to 20% solids. The slurry was heated to 120° F. and agitated while sulfur dioxide gas was bubbled in for 30 minutes. This treatment extracted 96% of the cobalt, 15% of the nickel and 4% of the iron content of the ore at a sulfur dioxide consumption of 4 pounds of sulfur per pound of cobalt in the ore.

Example III

A test was carried out similar to Example I in every respect except that the sulfur dioxide requirement was provided by a slow addition of sulfurous acid solution to the slurry. This treatment extracted 94% of the cobalt, 10% of the nickel and 1.4% of the iron content of the ore.

In treating nickel and cobalt containing ores such as New Caledonian ores, it is often possible to obtain a concentrate by mechanical separation. This is accomplished by separating out coarse, oversize material, such as by screening, consisting of pebbles which have a higher nickel and cobalt content than the fines. By this technique, it is possible to obtain a concentrate with cobalt and nickel contents of up to about 5% and 4%, respectively, from iron oxide type lateritic ores containing as little as 0.2% cobalt and 2% nickel. The following example illustrates the concentration of a New Caledonian ore by this technique followed by the novel leaching treatment according to the present invention.

Example IV

A coarse fraction, high in cobalt, was obtained by screening New Caledonian lateritic ore. This concentrate with a content of 5.03% cobalt, 2.82% nickel and 17.10% iron was ground through a —100 mesh Tyler screen and slurried with water to 15% solids. The slurry, heated to 140° F., was treated by bubbling in sulfur dioxide gas for 30 minutes. This treatment extracted 94% of the cobalt, 40% of the nickel and 1.4% of the iron content of the concentrate. Sulfur dioxide consumption was 6 pounds of sulfur per pound of cobalt in the concentrate.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for the treatment of a cobalt- and nickel-containing lateritic material of the iron oxide type with an iron content of between about 25% and about 55% and a magnesia content of less than about 10% for the selective removal of cobalt contained therein which comprises comminuting said iron oxide type material, preparing a water slurry of said comminuted iron oxide type material, maintaining said slurry at between about 70° F. and about 200° F., adding at least one sulfur compound from the group consisting of sulfur dioxide gas and sulfurous acid at substantially atmospheric pressure at a rate of between about 1 and 10 pounds of sulfur per pound of cobalt in the material being treated while agitating said slurry until between about 90% and about 96% of the cobalt and not more than about 40% of the nickel in said material is extracted in the water, separating the treated solids containing more than about 60% of the nickel in said iron oxide type material from the cobalt-containing solution and treating said solution for recovery of the cobalt contained therein.

2. A process for the treatment of a cobalt- and nickel-containing lateritic ore of the iron oxide type with an iron content of between about 25% and about 55% and a magnesia content of less than about 10% for the selective removal of cobalt contained therein which comprises comminuting said iron oxide type ore, preparing a water slurry of said comminuted iron oxide type ore, maintaining said slurry at between about 70° F. and about 200° F., adding at least one sulfur compound from the group consisting of sulfur dioxide gas and sulfurous acid at substantially atmospheric pressure at a rate of between about 1 and 10 pounds of sulfur per pound of cobalt in the material being treated while agitating said slurry until between about 90% and about 96% of the cobalt and less than 20% of the nickel in said ore is extracted in the water, separating the treated solids containing more than 80% of the nickel in said ore from the cobalt-containing solution, treating said solution for recovery of the cobalt contained therein and treating said solids for recovery of the nickel contained therein.

3. A process for the treatment of a cobalt- and nickel-containing lateritic ore of the iron oxide type with an iron content of between about 25% and about 55% and a magnesia content of less than about 10% for the selective removal of cobalt contained therein which comprises separating out a coarse fraction of said iron oxide type ore, comminuting said coarse fraction, preparing a water slurry of said comminuted material, maintaining said slurry at between about 70° F. and about 200° F., adding at least one sulfur compound from the group consisting of sulfur dioxide gas and sulfurous acid at substantially atmospheric pressure at a rate of between about 1 and 10 pounds of sulfur per pound of cobalt in the material being treated while agitating said slurry until between about 90% and 96% of the cobalt and not more than about 40% of the nickel in said comminuted material is extracted in the water, separating the treated solids containing more than about 60% of the nickel in said coarse fraction of said ore from the cobalt-containing solution and treating said solution for recovery of the cobalt contained therein.

4. A process for the treatment of a cobalt- and nickel-containing lateritic ore of the iron oxide type with an iron content of between about 25% and about 55% and a magnesia content of less than about 10%, in which the cobalt content is more than about 0.05%, for the selective removal of cobalt contained therein which comprises comminuting said iron oxide type ore to pass through a 48 mesh Tyler screen, preparing a water slurry of said comminuted iron oxide type ore with a solids content of between about 10% and about 50%, maintaining said slurry at between about 120° F. and about 160° F., adding at least one sulfur compound from the group consisting of sulfur dioxide gas and sulfurous acid at substantially atmospheric pressure at a rate of between about 1 and 10 pounds of sulfur per pound of cobalt in the material being treated, while agitating said slurry to at least prevent settling of the solids therein, until between about 90% and about 96% of the cobalt and less than 20% of the nickel in said ore is extracted in the water, separating the treated solids containing more than 80% of the nickel in said ore from the cobalt-containing solution and treating said solution for recovery of the cobalt contained therein.

5. A process for the treatment of a cobalt- and nickel-containing lateritic ore of the iron oxide type with an iron content of between about 25% and about 55% and a magnesia content of less than about 10%, in which the cobalt content is more than about 0.05%, for the selective removal of cobalt contained therein which comprises comminuting said iron oxide type ore to pass through a 48 mesh Tyler screen, preparing a water slurry of said comminuted iron oxide type ore with a solids content of between about 10% and about 50%, maintaining said slurry at between about 70° F. and about 200° F., adding at least one sulfur compound from the group consisting of sulfur dioxide gas and sulfurous acid at substantially atmospheric pressure at a rate of between about 1 and 10 pounds of sulfur per pound of cobalt in the material being treated, while agitating said slurry to at least prevent settling of the solids therein, until between about 90% and about 96% of the cobalt and less than 20% of the nickel in said ore is extracted in the water, separating the treated solids containing more than 80% of the nickel in said ore from the cobalt-containing solution, treating said solution for recovery of the cobalt contained therein and treating said solids for recovery of the nickel contained therein.

6. A process for the treatment of a cobalt- and nickel-containing lateritic ore of the iron oxide type with an iron content of between about 25% and about 55% and a magnesia content of less than about 10%, in which the cobalt content is more than about 0.05%, for the selective removal of cobalt contained therein which comprises comminuting said iron oxide type ore to pass through a 100 mesh Tyler screen, preparing a water slurry of said comminuted iron oxide type ore with a solids content of between about 10% and about 50%, maintaining said slurry at between about 120° F. and about 160° F., adding at least one sulfur compound from the group consisting of sulfur dioxide gas and sulfurous acid at substantially atmospheric pressure at a rate of between about 1 and 10 pounds of sulfur per pound of cobalt in the material being treated, while agitating said slurry to at least prevent settling of the solids therein, until between about 90% and about 96% of the cobalt and less than 20% of the nickel in said ore is extracted in the water, separating the treated solids containing more than 80% of the nickel in said ore from the cobalt-containing solution, treating said solution for recovery of the cobalt contained therein and treating said solids for recovery of the nickel contained therein.

7. A process for the treatment of a cobalt- and nickel-containing lateritic ore of the iron oxide type with an iron content of between about 25% and about 55% and a magnesia content of less than about 10% for the selective removal of cobalt contained therein which comprises separating out a coarse fraction of said iron oxide type ore, comminuting said coarse fraction of iron oxide type ore to pass through a 100 mesh Tyler screen, preparing a water slurry of said comminuted material with a solids content of between about 10% and about 50%, maintaining said slurry at between about 120° F. and about 160° F., adding at least one sulfur compound from the group consisting of sulfur dioxide gas and sulfurous acid at substantially atmospheric pressure at a rate of between about 1 and 10 pounds of sulfur per pound of cobalt in the material being treated, while agitating said slurry to at least prevent settling of the solids therein, until between about 90% and about 96% of the cobalt and not more than about 40% of the nickel in said comminuted material is extracted in the water, separating the solids so treated from the cobalt-containing solution, treating said solution for recovery of the cobalt contained therein and treating said solids for recovery of the nickel contained therein.

References Cited in the file of this patent

UNITED STATES PATENTS

| | | |
|---|---|---|
| 2,778,729 | Schaufelberger | Jan. 22, 1957 |
| 2,928,732 | Bare et al. | Mar. 15, 1960 |

FOREIGN PATENTS

| | | |
|---|---|---|
| 446,289 | Canada | Jan. 20, 1948 |